United States Patent
Trowell et al.

(10) Patent No.: US 12,084,345 B2
(45) Date of Patent: Sep. 10, 2024

(54) METHOD FOR HYDROGEN PRODUCTION VIA METAL-WATER REACTION

(71) Applicant: THE ROYAL INSTITUTION FOR THE ADVANCEMENT OF LEARNING/ MCGILL UNIVERSITY, Montreal (CA)

(72) Inventors: Keena Trowell, Montréal (CA); Jeffrey Myles Bergthorson, Montreal-West (CA); David Frost, Verdun (CA); Sam Goroshin, St-Laurent (CA)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 355 days.

(21) Appl. No.: 17/598,927

(22) PCT Filed: Mar. 26, 2020

(86) PCT No.: PCT/CA2020/050392
§ 371 (c)(1),
(2) Date: Sep. 28, 2021

(87) PCT Pub. No.: WO2020/198850
PCT Pub. Date: Oct. 8, 2020

(65) Prior Publication Data
US 2022/0153578 A1    May 19, 2022

Related U.S. Application Data

(60) Provisional application No. 62/826,173, filed on Mar. 29, 2019.

(51) Int. Cl.
    *C01B 3/08* (2006.01)

(52) U.S. Cl.
    CPC ................... *C01B 3/08* (2013.01)

(58) Field of Classification Search
    CPC ....................................... C01B 3/08
    See application file for complete search history.

(56) References Cited

U.S. PATENT DOCUMENTS

| | | | |
|---|---|---|---|
| 2010/0080755 A1* | 4/2010 | Parker | C01B 3/08 422/162 |
| 2010/0173225 A1* | 7/2010 | Rosenband | C01B 3/08 123/3 |

(Continued)

FOREIGN PATENT DOCUMENTS

| | | |
|---|---|---|
| CN | 102834489 A | 12/2012 |
| WO | 0240395 A1 | 5/2002 |
| WO | 2004071950 A1 | 8/2004 |

OTHER PUBLICATIONS

Alinejad, B. et al: "A novel Method for Generating Hydrogen by Hydrolysis of Highly Activated Aluminium Nanoparticles in Pure Water"; International Journal of Hydrogen Energy; Aug. 14, 2009; vol. 34; pp. 7934-7938.

(Continued)

*Primary Examiner* — Paul A Wartalowicz

(57) ABSTRACT

Process for producing hydrogen gas from water is disclosed. The hydrogen gas is produced by exposing a reactive metal to an aqueous solution, where the aqueous solution is under supercritical conditions or is at a temperature of at least 200° C. and at a pressure of at least the saturated vapor pressure of water at said temperature. The reactive metals include Al, B, Mg, Si, Ti, Mn, and Zn. Heat and metal oxides and/or metal hydroxides may also be recovered from the process. The process may be used to produce hydrogen on demand in applications for producing clean energy.

9 Claims, 4 Drawing Sheets

(56) References Cited

U.S. PATENT DOCUMENTS

2011/0147266 A1 6/2011 Choi
2017/0210622 A1 7/2017 Nestl et al.

OTHER PUBLICATIONS

Vostrikov, A. A. et al: "The Formation of Al2O3 Nanoparticles in the Oxidation of Aluminium by Water Under Sub- and Supercritical Conditions"; Russian Journal of Physical Chemistry B; Jan. 19, 2011; vol. 4; pp. 1051-1060.
Bergthorson, J.M. et al: "Metal-Water Combustion for Clean Propulsion and Power Generation"; Applied Energy; Nov. 4, 2016; vol. 186; pp. 13-27.
Putri Setiani, et al: "Mechanisms and kinetic model of hydrogen production in the hydrothermal treatment of waste aluminum"; Materials for Renewable and Sustainable Energy (2018); Received: Jan. 22, 2018 / Accepted: Mar. 29, 2018 / Published online: Apr. 7, 2018; pp. 1-13.
M.S. Vlaskin, et al: "Oxidation kinetics of micron-sized aluminum powder in high-temperature boiling water"; The Joint Institute for High Temperatures, Ijorskaya st. 13/2, 125412 Moscow, Russia; Available online Mar. 29, 2011; International Journal of Hydrogen Energy 36 (2011) 6484-6495 Copyright 2011, Hydrogen Energy Publications, LLC. Published by Elsevier Ltd. All rights reserved.
PCT International Search Report and Written Opinion of International Searching Authority dated Jun. 4, 2020 corresponding to PCT International Application No. PCT/CA2020/050392 filed Mar. 26, 2020.
Woodcock, Leslie: "Supercritical water: percolation transitions and a colloidal mesophase", Proceedings of International Conference on Properties of Water and Steam, May 19, 2014 (May 19, 2014), pp. 1-18, XP055980257, Retrieved from the Internet: URL:https://arxiv.org/ftp/arxiv/papers/1308/1308.4481.pdf [retrieved on Nov. 11, 2022].
Extended European Search Report dated Nov. 21, 2022 corresponding with EP Application No. 20782119.0 filed Sep. 29, 2021.

* cited by examiner

METHOD FOR HYDROGEN PRODUCTION VIA METAL-WATER REACTION

The present application claims priority from U.S. provisional patent application Ser. No. 62/826,173, filed Mar. 29, 2019 and entitled "METHOD FOR HYDROGEN PRODUCTION VIA METAL-WATER REACTION", the disclosure of which is hereby incorporated by reference in its entirety.

FIELD OF THE DISCLOSURE

The disclosure relates to a method designed to oxidize metals to produce heat, hydrogen and metal oxides/hydroxides.

BACKGROUND OF THE DISCLOSURE

The shift away from fossil fuels to more sustainable energy sources is inevitable. Hydrogen has the potential to replace fossil fuels in many applications requiring high power owing to its high specific energy density. Currently, over 85% of the hydrogen produced today is produced via the reformation of methane ($CH_4$), a process which releases greenhouse gasses (GHGs) and is still reliant on fossil fuels. As the price of renewables comes down, the economic argument for using electricity to make fuels (rather than fossil fuels to make electricity as is currently the case with coal- and gas-fired plants) strengthens.

Hydrogen can also be produced via electrolysis, a technique which uses an electric current to split a water molecule into its constituent hydrogen and oxygen. Electrolysis releases no process GHG emissions but, like methane reformation, requires the hydrogen to be stored and transported which introduces a host of safety concerns.

There remains a need to produce hydrogen on-demand, in-situ, therefore preventing the need to store or transport hydrogen, while generating no GHGs.

SUMMARY OF THE DISCLOSURE

An aspect of the disclosure relates to a process for producing hydrogen gas from water. The process involves exposing a reactive metal to an aqueous solution under supercritical conditions or to an aqueous solution at a temperature of at least 200° C. and a pressure of at least the saturated vapour pressure of the water at said temperature.

DETAILED DISCLOSURE

Figure 1A:
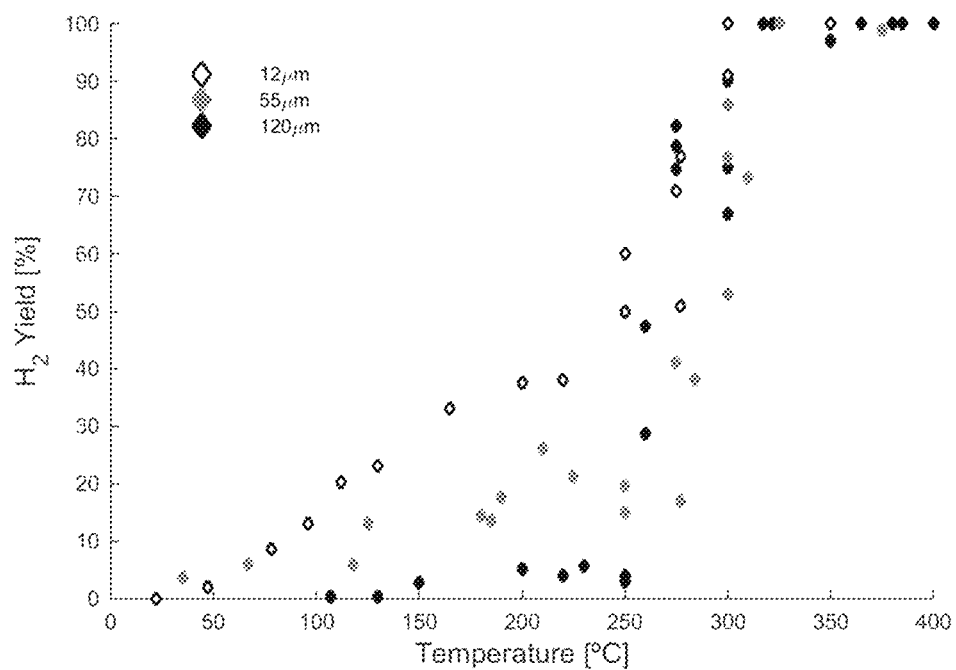
FIGS. 1A, 1B and 1C present the normalized hydrogen yield, as a percentage of full yield, for various aluminum morphologies.

"Metals" may be effective and clean energy carriers because metals are energy dense, have high specific energy densities, and they provide a convenient package with which to store and transport energy. These metals can be produced from clean electricity without GHG emissions, storing the energy for later use. By casting metal fuels as the energy carrier, rather than hydrogen, the major obstacles surrounding a sustainable hydrogen economy are addressed; that is the need to store and transport hydrogen is negated. Rather, the metal is oxidized in water to produce hydrogen on demand.

The present disclosure provides a process by which hydrogen can be produced with high efficiency from reactive metals, through the reaction of the metals with supercritical water and/or high-temperature, high-pressure water.

In one embodiment, there is provided a process for producing hydrogen from a metal, such as Al, B, Mg, Si, Ti, Mn, Zn, or a combination thereof or their alloys thereof. It is contemplated that the metal is preferably in solid state at the process temperature and may have a coating of the oxide of the selected metal/alloy. In this method, there is no requirement to embed, dissolve, or incorporate the metal with/in another material inert to water under the process conditions herein described.

Other optionally recoverable products of the process include heat, and metal oxides/hydroxides. The process is conducted in water at elevated temperatures and pressures.

In one embodiment, the reaction is carried out under supercritical water conditions; that is, at temperatures above the critical temperature of about 373° C., and pressures adequate to keep the water near to or above the critical specific density of 322 $kg/m^3$, for example pressures of at least 217 atm (220 bars).

In another embodiment, the temperatures will be of at least about 200° C., or ranging from 200° C. to 400° C., and the pressure is at minimum the saturated vapour pressure of the water at the corresponding temperature, or adequately high to ensure the presence of sufficient liquid water or saturated liquid-vapour mixture so that the reactive metal is in liquid water.

The process described herein is a catalyst-free, and additive-free process. In particular, the process is conducted without requiring the addition of externally supplied non-metal (ceramic) such as, aluminum hydroxide(s) and/or aluminum oxide(s). In addition, the process is conducted without requiring the addition of an inorganic base, such as caustic base (NaOH or KOH). The process is also conducted without the mechanical manipulation of the metal prior to reaction, manipulation(s) intended to disrupt the passivating oxide layer. The process does not require alloying of the fuel metal with highly reactive metals such as Li or Na.

The process as provided herein further does not require the "reactive metal" to be used with a passivating-oxide preventing agent, such as gallium, gallium-indium, gallium-indium-tin and other suitable alloys that are liquid at low temperatures (e.g., below 373° C.) and that are substantially inert to water from a standpoint of splitting water into hydrogen.

The process even allows for the use of coarsely produced metal powders, chips, or scrap fragments. It is believed that this is possible under supercritical conditions because the hydroxides formed in the reaction dissolve in the fluid rather than protecting the metal from further oxidation.

The aqueous solution for use in this disclosure is not especially limited and may be tap water, and even sea water. The water may also be purified to some extent e.g. by reverse osmosis water (i.e. deionized (demineralized) water) if desired.

The metal-water reaction process herein may chemically be depicted by the general equation:

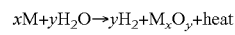

$xM + yH_2O \rightarrow yH_2 + M_xO_y + heat$

Metals such as Al, B, Mg, Si, Ti, Mn, Zn are thermodynamically predicted to react with water in temperatures above 200° C. In the following examples, the process has been experimentally demonstrated for Al, Mg and Zn. B, Si, Ti, Mn, or any combination of those or together with a combination Al, Mg and Zn are embodiments of this disclosure. Under the process conditions, the metals listed are predicted to occupy a higher energy state when exposed to an aqueous solution, than their oxides and hydrogen gas, therefore the oxidation reaction is thermodynamically predicted to proceed under the process conditions. For example, at 300° C., manganese and water are at a higher energy state than manganese oxide and hydrogen therefore the reaction to split the water molecule and oxidize the metal will occur.

As an exemplary metal, in accordance with this disclosure, hydrogen can be produced with high efficiency from coarse aluminum powders, and even aluminum scrap, through the reaction of the metals with high-temperature/high-pressure water and supercritical water. In particular, the use of supercritical water may provide a full hydrogen yield for a range of aluminum powders, for aluminum slugs of several millimeters or larger, and scrap aluminum cans.

The reactions follow one of two pathways depending on the temperature and pressure of the reaction:

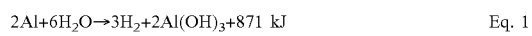

$$2Al + 6H_2O \rightarrow 3H_2 + 2Al(OH)_3 + 871 \text{ kJ} \qquad \text{Eq. 1}$$

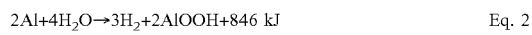

$$2Al + 4H_2O \rightarrow 3H_2 + 2AlOOH + 846 \text{ kJ} \qquad \text{Eq. 2}$$

As can be seen from Eq.1 and Eq2, 1 mole of aluminum yields 1.5 moles of hydrogen. This means that 1 kg of aluminum yields 1.2 cubic metres of hydrogen (at standard conditions), regardless of pathway. Furthermore, there is no release of process $CO_2$ or other GHGs in the reaction. The hydroxides formed in the reaction are inert and readily recyclable, because there is no addition of a catalyst.

It was surprisingly found that an increase in reaction temperature has led to a significant increase in heat and hydrogen yield of the reaction. It is believed that once in the supercritical regime, water becomes a solvent for non-polar species such as the oxides and hydroxides that form as a result of the reaction. Because of this change in property, the products do not adhere to the surface of the unreacted metal, but rather dissolve into the water. This would explain that this continual exposure of reactive metal to the oxidizing fluid results in full yield, regardless of initial particle size. When the temperature is reduced to subcritical levels (for example from 373° C. to 200° C.), the solid reaction products precipitate out of the liquid. The following examples have shown that the reaction efficiency for coarse metal powders or even metal scrap is drastically improved as the reaction temperature increases. Metal scrap and macroscopic metal slugs are shown to be converted to hydrogen with 100% efficiency in supercritical water. For finer powders/materials, full yield can be obtained under subcritical water conditions (for example from 200° C. to 373° C.).

EXAMPLES

The experiments were carried out using a high-pressure confined gasket closure reactor (High Pressure Equipment Company GC-1 reactor). The reactor is housed in a heating mantle which is heated by a resistive heater. A dual element K-type thermocouple (Omega CAXL-116-U-12-DUAL) and a pressure transducer (WIKA A-10), both connected to a digital oscilloscope (Yokogawa DL750 ScopeCorder), are used to monitor the conditions inside the reactor during experiments and to record data. The oscilloscope was replaced with a Raspberry Pi microcomputer with an analogue to digital converter chip (MCP3008) to capture the signal from the pressure transducer and a chip to capture the temperature signal (MAX31855).

In each experiment, a measured amount of metal and deionized water was placed inside the reactor cell and the reactor was sealed. Each experiment used approximately 1 g of metal and 27 ml of deionized water. The amount of water was calibrated to ensure that liquid water was always present at temperatures below the critical temperature and that at the critical temperature the water density was equal to the critical density. To ensure that any hydrogen produced by the reaction was recorded by the instruments, the system was pressurized with an initial amount of hydrogen and this initial pressure, p1, was recorded. The reactor was then heated to the desired temperature and held at that temperature until the pressure reading becomes constant. The constant pressure at a constant temperature was an indication that the reaction had quenched. The apparatus was then cooled to the initial temperature and a second pressure reading, p2, recorded. Yield was determined using the ideal gas law to calculate hydrogen evolution based on the difference between p1 and p2.

Three micron-scale aluminum powders shown in FIG. 1A produced by Valimet (Stockton, CA) and are referred to as H10, H50 and H95 with nominal diameters of 12, 55 and 120 micron respectively. According to Valimet's literature, these powders are 99.7% pure aluminum and have no coating other than the naturally occurring passivation layer of aluminum oxide on the surface of the powder.

The above experimental conditions was repeated using different types and shapes of aluminum as well as other metals and water source as reagent. The same protocol as described above was used for all shapes and metals The results are described below.

Figure 1B:
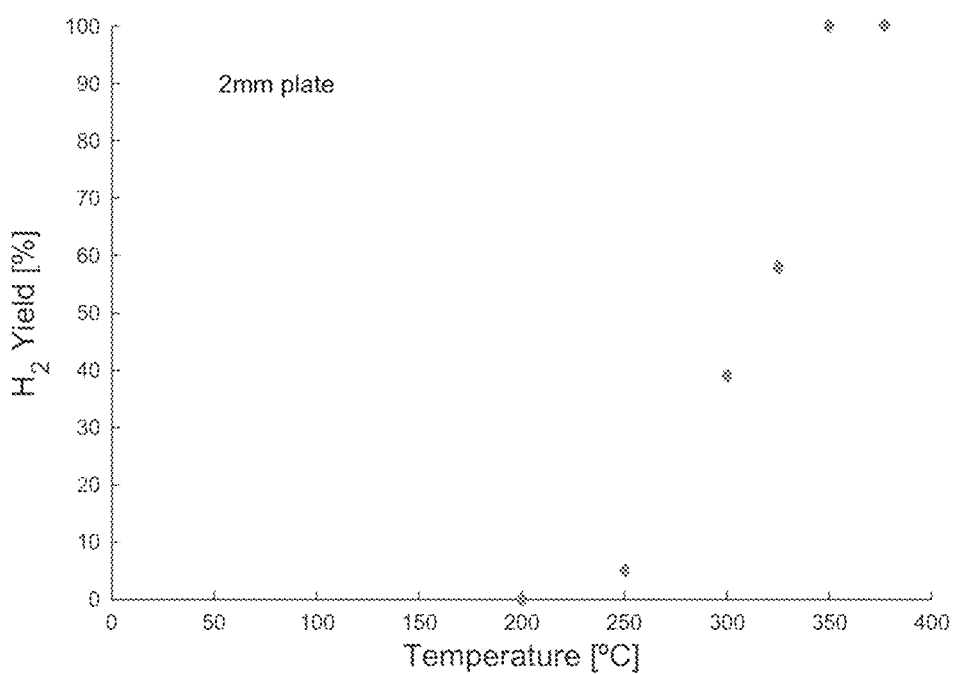
Figure 1C:
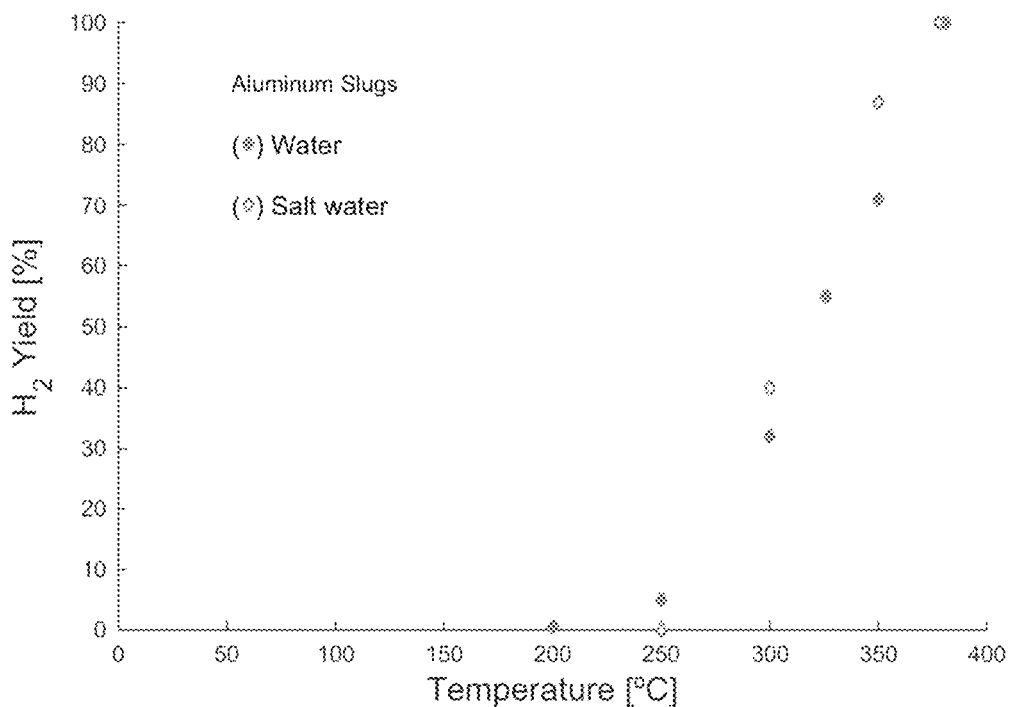

The aluminum plate and slugs (i.e. of generally cylindrical shape) used in FIG. 1B and FIG. 1C, respectively, were procured from Alfa Aesar and have a 99.99% metals basis purity.

Figure 2A:
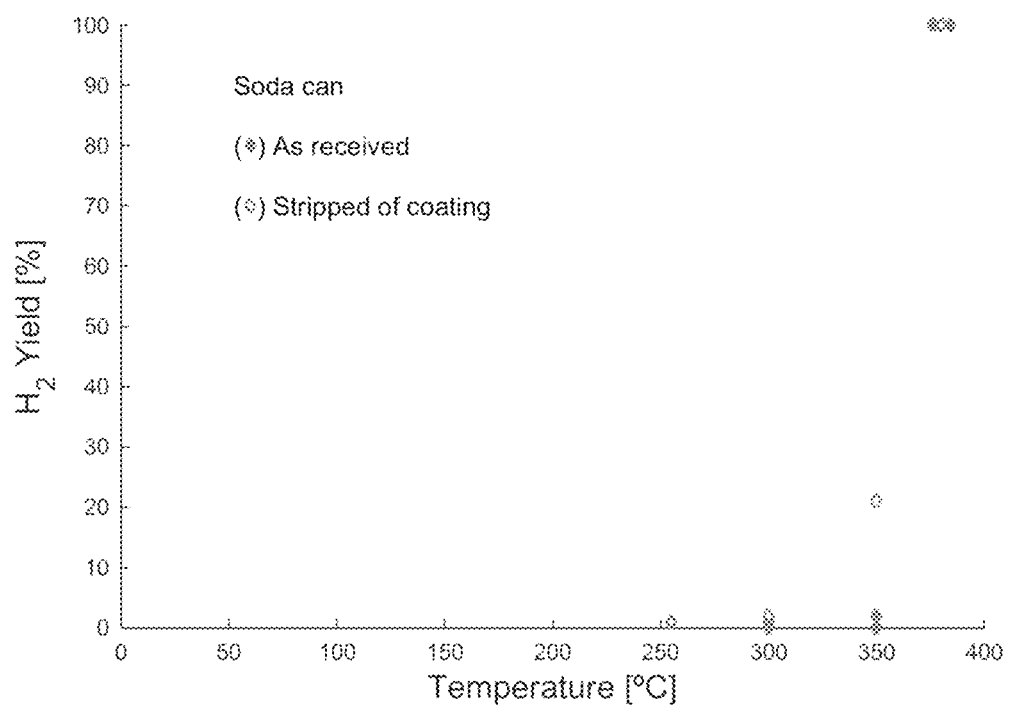
FIGS. 2A and 2B present the normalized hydrogen yield for various common aluminum alloys

The alloy used to obtain the results shown in FIG. 2A was procured from a common aluminum beverage can (LaCroix brand).

The aluminum alloys 5052 and 6061, the zinc and magnesium slugs used herein (results shown in FIGS. 2B, 3A and 3B) were procured from Alfa Aesar FIGS. 1A-1C present the normalized hydrogen yield, as a percentage of full yield, for various aluminum morphologies.

FIG. 1A are the yields for three aluminum powders ranging in nominal size from 12 micron to 120 micron. As can be seen in the figure, the smallest particle reacted fully at temperatures of about 275° C., while the largest particle only begins reacting at that temperature.

FIG. 1B shows the yield for an aluminum plate with a thickness of 2 mm, width of approximately 10 mm and length of approximately 100 mm. At 200° C. there is no reaction with the water and as temperature increases so does the yield. Complete reaction is achieved at temperatures above 350° C.

FIG. 1C shows the yield for aluminum slugs measuring approximately 3 mm in diameter and 4 mm in length. Again, as temperature increased, so did the yield. Full yield was even achieved at supercritical temperatures. Experiments were also conducted following the same methodology but replacing the reverse osmosis water with salt water. The salt water has the same salinity as sea water (35 parts per thousand). The results showed a similar trend with yield occurring in supercritical fluid.

Figure 2B:
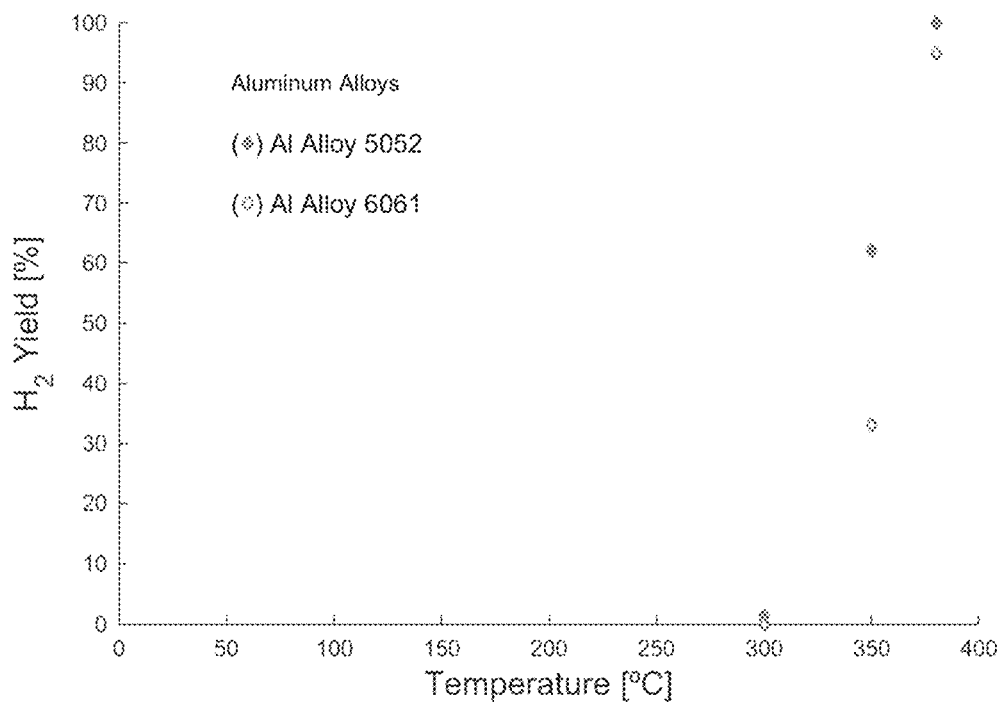

FIGS. 2A-2B present the normalized hydrogen yield for aluminum obtained from a commercial can and two further aluminum alloys.

FIG. 2A shows the yield for a common aluminum beverage can. The walls of the can were cut into strips measuring approximately 3 mm in width and 30 mm in length. As can be seen in FIG. 2A, there was no reaction in the water until the supercritical regime is reached, after which was observed 100% yield of hydrogen.

Figure 4:
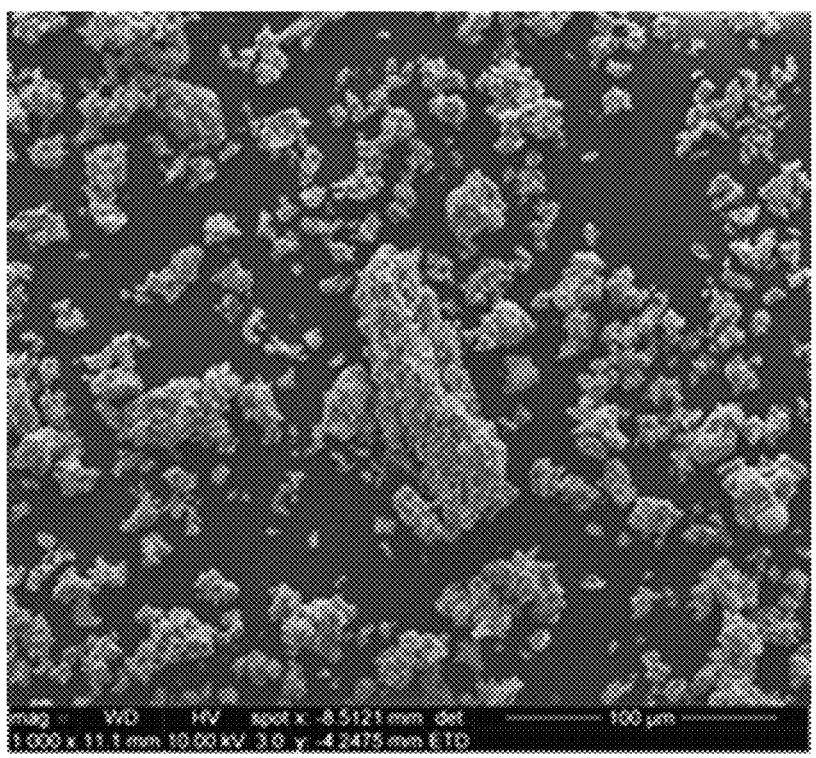
FIG. 4 shows the SEM image of the reaction products from aluminum in accordance with one embodiment of this disclosure.

The reaction products of the 380° C. experiment, as shown by the SEM image in FIG. 4, were a very fine powder with particles as small as 1 micron. This confirms that the aluminum oxides and hydroxides that form during the aluminum-water reaction dissolve in the supercritical water. This enables highly efficient hydrogen production from coarse aluminum powders and waste aluminum under supercritical water conditions.

FIG. 2B shows the yields for two common aluminum alloys, Alloy 5052 and Alloy 6061. The plates used in these experiments were approximately 1-2 mm thick, approximately 10 mm wide and approximately 100 mm long. Alloy 5052 is more reactive than Alloy 6061, they both show an increase in hydrogen yield as temperature increases.

Figure 3A:
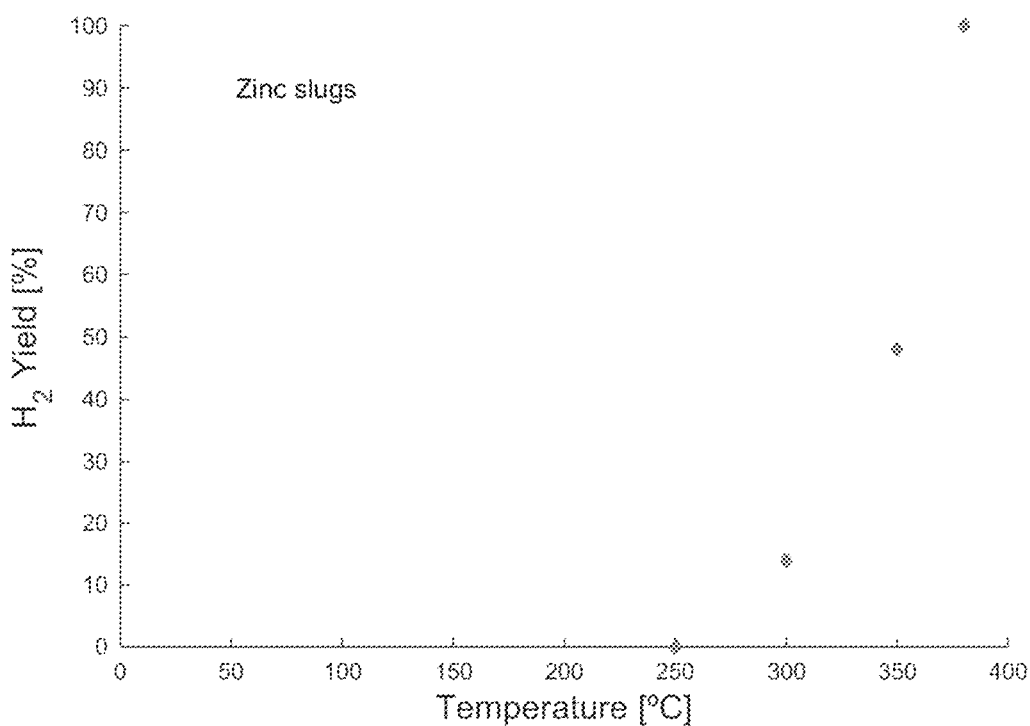
FIGS. 3A and 3B present the normalized hydrogen yield for zinc and magnesium respectively
Figure 3B:
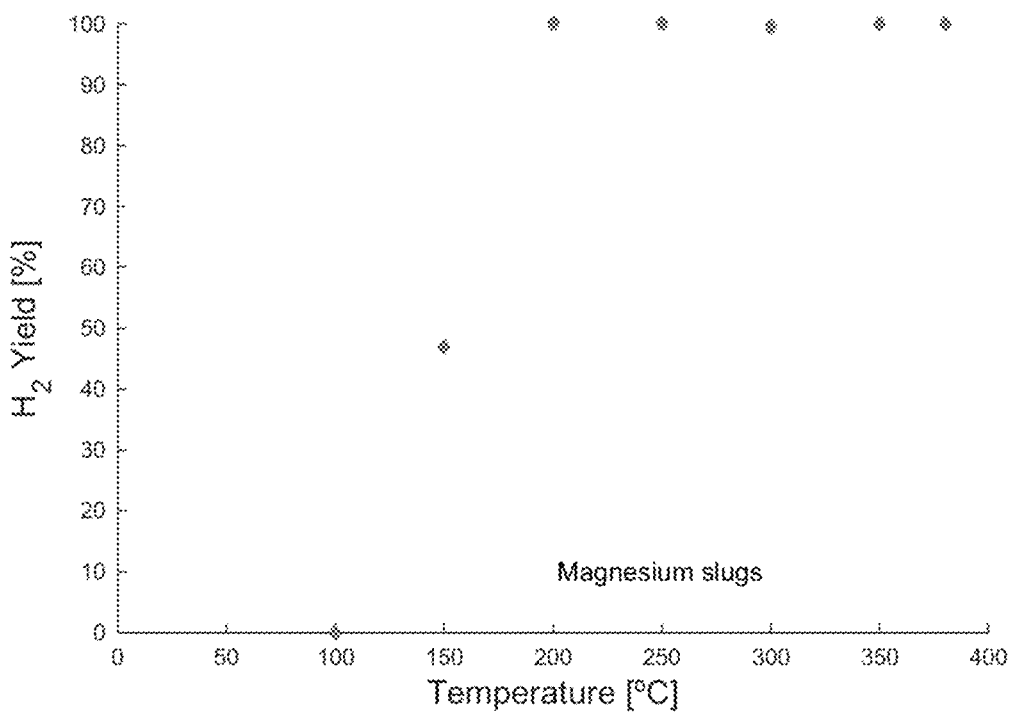

FIGS. 3A-3B present the normalized hydrogen yield for two other metals, zinc and magnesium.

FIG. 3A shows the yield for zinc slugs, approximately 3 mm in diameter and 4 mm in length. Yield increases with temperature and full yield is achieved in the supercritical regime.

FIG. 3B shows the yield for magnesium slugs, approximately 3 mm in diameter and 4 mm in length. While yield increases with temperature, magnesium is shown to be more reactive than the other metals tested. Full yield is reached at 200° C.

The invention claimed is:

1. A process for producing hydrogen gas from water, the process comprising: exposing a metal capable of generating hydrogen to an aqueous solution under supercritical conditions, or at a temperature of at least 200° C. and a pressure of at least the saturated vapor pressure of the water at said temperature; wherein said metal capable of generating hydrogen is Al, B, Mg, Si, Ti, Mn, Zn, or a combination thereof or their alloys thereof, and the metal is in solid state at the process temperature and has a coating of the oxide of the selected metal and/or alloy; wherein the coating is intact prior to the exposing of the reactive metal to the aqueous solution.

2. The process of claim 1, wherein the supercritical conditions comprise temperatures above about 373° C.

3. The process of claim 1, wherein the supercritical conditions comprise a pressure adequate to keep the water above the critical specific density of 0.003106 kg/m3.

4. The process of claim 3, wherein the supercritical conditions comprise a pressure of at least 10100 kPa (100 atm).

5. The process of claim 1, wherein the temperature ranges from 200° C. to 400° C.

6. The process of claim 1, further comprising recovering heat and at least one of metal oxides and metal hydroxides resulting from the process.

7. The process of claim 1, wherein the aqueous solution comprises salt water.

8. The process of claim 1, wherein the aqueous solution comprises deionized water.

9. The process of claim 1, wherein the metal is in a form selected from the group consisting of slugs, plates, scrap metal, fine powders, coarse powders, or combinations of said forms.

* * * * *